US011307586B2

(12) United States Patent
James

(10) Patent No.: US 11,307,586 B2
(45) Date of Patent: Apr. 19, 2022

(54) OFFROAD TRAVEL ASSISTANCE SYSTEM FOR A VEHICLE

(71) Applicant: Toyota Motor Engineering & Manufacturing North America, Inc., Plano, TX (US)

(72) Inventor: Kevin J. James, Saline, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 125 days.

(21) Appl. No.: 16/792,716

(22) Filed: Feb. 17, 2020

(65) Prior Publication Data
US 2021/0255621 A1  Aug. 19, 2021

(51) Int. Cl.
*G05D 1/00* (2006.01)
*G07C 5/08* (2006.01)
*B60W 60/00* (2020.01)

(52) U.S. Cl.
CPC ......... *G05D 1/0088* (2013.01); *B60W 60/001* (2020.02); *B60W 60/0053* (2020.02); *G07C 5/0808* (2013.01); *B60W 2540/215* (2020.02); *B60W 2552/05* (2020.02)

(58) Field of Classification Search
CPC ............ G05D 1/0088; B60W 60/0053; B60W 60/001; B60W 2540/215; B60W 2552/05; G07C 5/0808
See application file for complete search history.

(56) References Cited

U.S. PATENT DOCUMENTS

| 9,953,535 | B1* | 4/2018 | Canavor | G05D 1/0289 |
| 10,416,677 | B2* | 9/2019 | Dean | G05D 1/0214 |
| 2010/0090797 | A1 | 4/2010 | Koenig et al. | |
| 2014/0244110 | A1 | 8/2014 | Tharaldson et al. | |
| 2016/0003621 | A1* | 1/2016 | Koenig | G06F 3/04845 701/31.4 |
| 2017/0292850 | A1* | 10/2017 | Madapati | G01S 19/42 |
| 2020/0117187 | A1* | 4/2020 | Kothari | B60W 50/14 |
| 2021/0173399 | A1* | 6/2021 | Richard | B60W 50/14 |

FOREIGN PATENT DOCUMENTS

| CN | 106799993 A | 6/2017 |
| DE | 102009060213 B4 | 6/2011 |

* cited by examiner

*Primary Examiner* — Vivek D Koppikar
*Assistant Examiner* — Jeffrey R Chalhoub
(74) *Attorney, Agent, or Firm* — Christopher G. Darrow; Darrow Mustafa PC

(57) ABSTRACT

An offroad travel assistance system for a user vehicle includes one or more processors and a memory communicably coupled to the one or more processors and storing a user vehicle configuration evaluation module including computer-readable instructions that when executed by the one or more processors cause the one or more processors to determine if user vehicle configuration information describing the user vehicle is consistent with ride information similar to the user vehicle configuration information and describing a traversal of an offroad trail by a reference vehicle and, responsive to a determination that the user vehicle configuration information is not consistent with the ride information, autonomously control at least one portion of the user vehicle so as to prevent operation of the user vehicle to traverse the offroad trail.

17 Claims, 5 Drawing Sheets

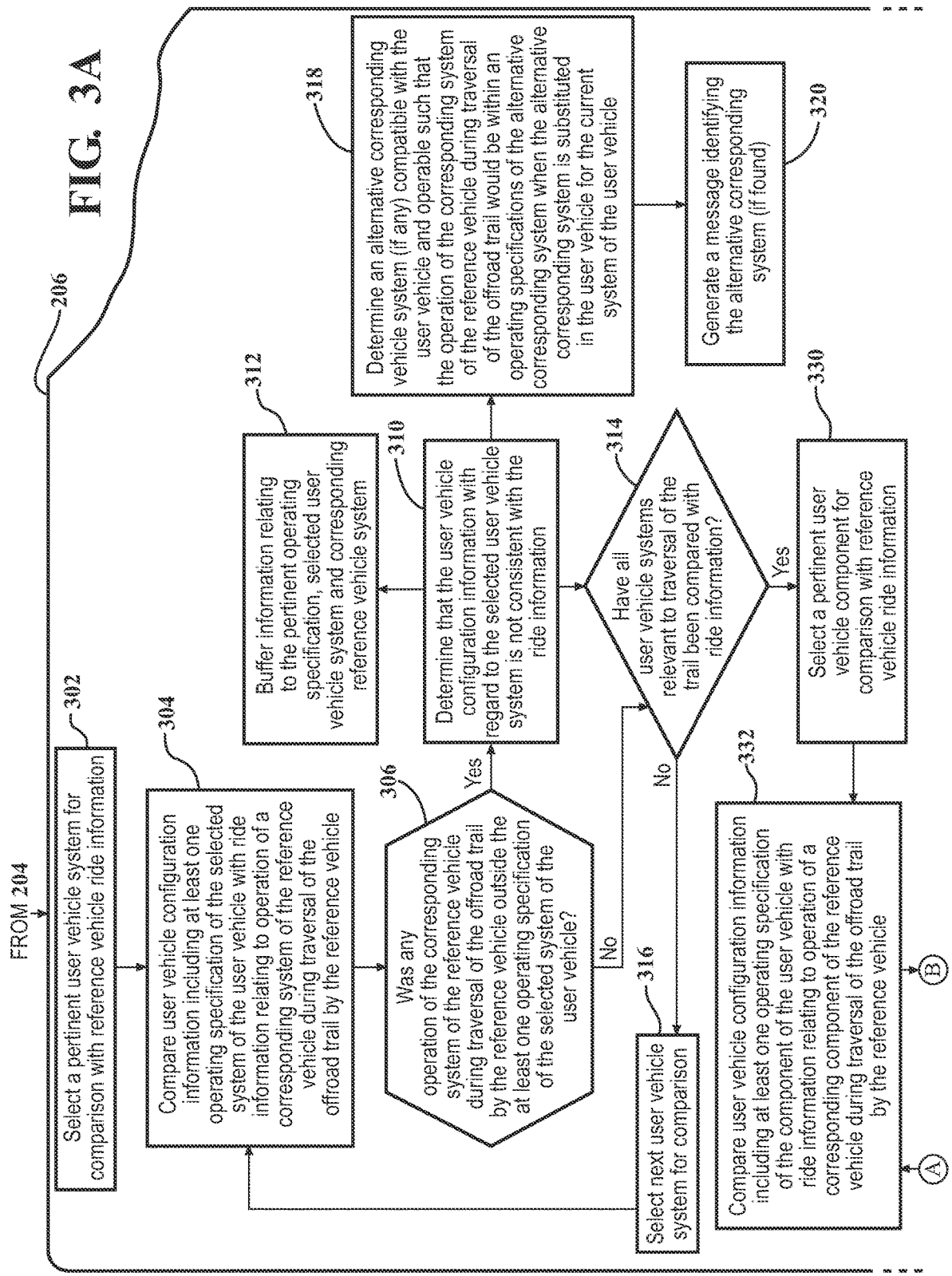

OFFROAD TRAVEL ASSISTANCE SYSTEM FOR A VEHICLE

TECHNICAL FIELD

The subject matter described herein relates, in general, to autonomous control of elements of a vehicle, and, more particularly, to autonomous control of the vehicle to prevent damage to the vehicle due to traversing a route which the vehicle may not be configured to traverse.

BACKGROUND

The activity of "offroading" or "offroad travel" refers to a vehicle traversing an offroad trail (i.e., a trail involving movement "cross-country" or along an unpaved route (especially a route involving rough terrain) on a ground surface). The offroad trail may be a new trail established by a first-time movement of the vehicle along the unpaved route. Alternatively, the offroad trail may have been previously established by the vehicle (or by another vehicle) traveling along the unpaved route. This activity is increasingly popular among truck and recreational vehicle owners. However, an offroad trail traversed by a first vehicle may not be suitable for traversal by a second, different vehicle. The mechanical and operational capabilities of the second vehicle may not facilitate or enable its traversal of the offroad trail (i.e., the first vehicle may have been better equipped to traverse the trail). It may be difficult to quickly and accurately estimate the ability of other vehicles to traverse a trail driven by the first vehicle without damage to the other vehicles.

SUMMARY

In one aspect of the embodiments described herein, an offroad travel assistance system for a user vehicle is provided. The system may include one or more processors and a memory communicably coupled to the one or more processors. The memory stores a user vehicle configuration evaluation module including computer-readable instructions that when executed by the one or more processors cause the one or more processors to (a) determine if user vehicle configuration information describing the user vehicle is consistent with ride information similar to the user vehicle configuration information and describing a traversal of an offroad trail by a reference vehicle; and (b) responsive to a determination that the user vehicle configuration information is not consistent with the ride information, autonomously control at least one portion of the user vehicle so as to prevent operation of the user vehicle to traverse the offroad trail.

In another aspect of the embodiments described herein, a method of controlling operation of a user vehicle is provided. The method includes steps of determining if user vehicle configuration information describing the user vehicle is consistent with ride information similar to the user vehicle configuration information and describing a traversal of an offroad trail by a reference vehicle and, responsive to a determination that the user vehicle configuration information is not consistent with the ride information, autonomously control at least one portion of the user vehicle so as to prevent operation of the user vehicle to traverse the offroad trail.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIG. 3A is a flow diagram illustrating operations conducted to determine whether user vehicle configuration information is consistent with ride information relating to the proposed offroad trail.

DETAILED DESCRIPTION

Embodiments described herein relate to an offroad travel assistance system for a user vehicle. The system may include one or more processors and a memory communicably coupled to the one or more processors. The memory stores a user vehicle configuration evaluation module including computer-readable instructions that when executed by the one or more processors cause the one or more processors to (a) determine if user vehicle configuration information describing the user vehicle is consistent with ride information similar to the user vehicle configuration information and describing a traversal of an offroad trail by a reference vehicle; and (b) responsive to a determination that the user vehicle configuration information is not consistent with the ride information, autonomously control at least one portion of the user vehicle so as to prevent operation of the user vehicle to traverse the offroad trail. If the vehicle configuration information is consistent with the ride information, the vehicle may traverse the trail manually, semi-autonomously, or autonomously. If the vehicle configuration information is not consistent with the ride information, a user may override autonomous control of portion(s) of the user vehicle so as to prevent operation of the user vehicle to traverse the offroad trail. The user may then drive the vehicle manually or semi-autonomously to traverse the trail. Alternatively, the user may instruct the vehicle to autonomously drive itself along the trail. The offroad travel assistance system may also determine alternative user vehicle systems and/or components which may, if installed in the user vehicle, enable the vehicle to traverse the trail without damage to the vehicle.

Figure 1:
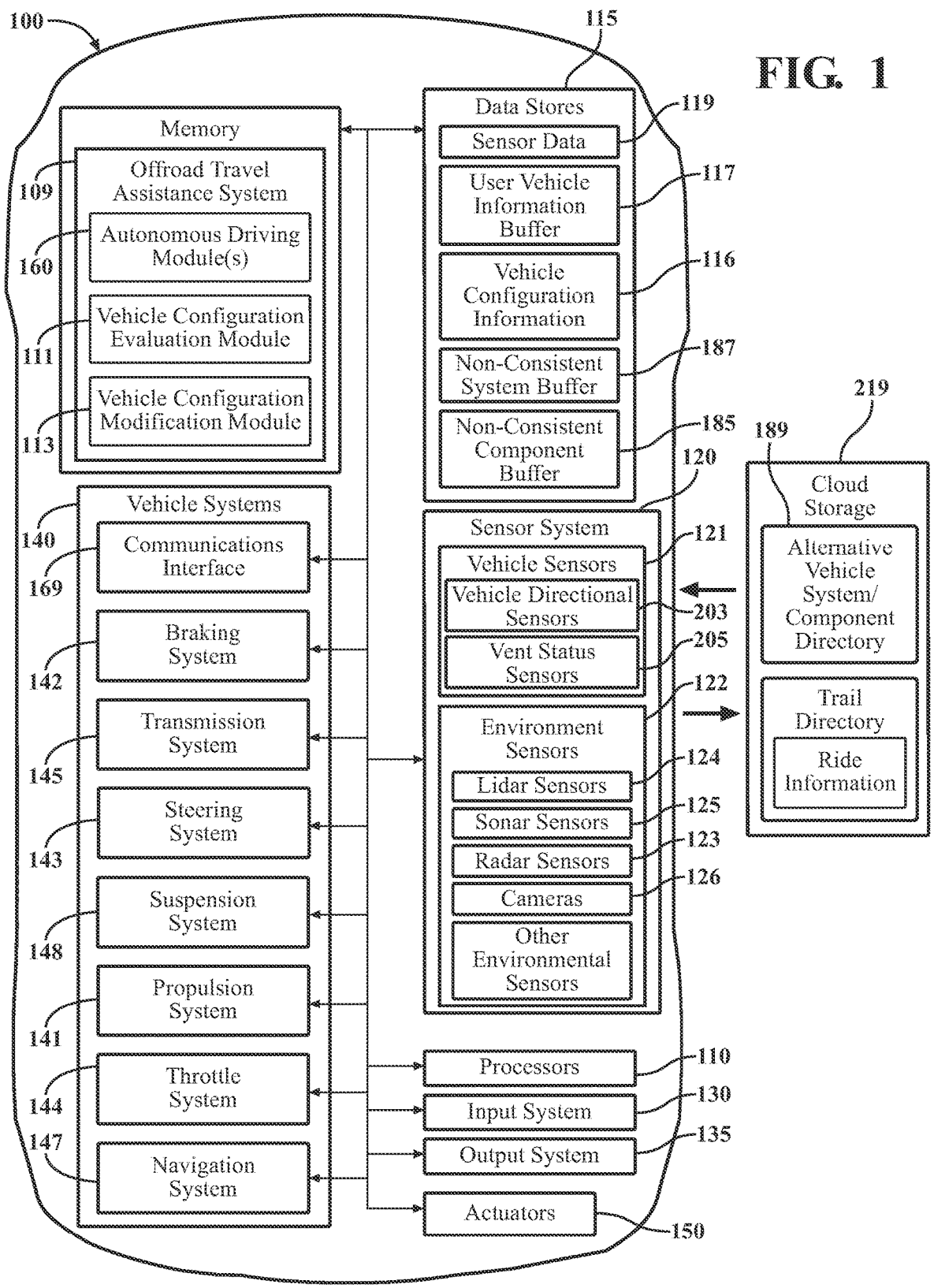
FIG. 1 illustrates a vehicle incorporating an offroad travel assistance system in accordance with an embodiments described herein.

Referring to FIG. 1, an example of a vehicle 100 is illustrated. As used herein, a "vehicle" is any form of motorized transport. In one or more implementations, the vehicle 100 is sport utility vehicle or a pickup truck. While arrangements will be described herein with respect to sport utility vehicles, it will be understood that embodiments are not limited to sport utility vehicle. In some implementations, the vehicle 100 may be any form of motorized transport that, for example, emits exhaust or gaseous emissions during operation of the vehicle, and thus benefits from the functionality discussed herein.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described with reference thereto. Additionally, it will be appreciated that for simplicity and clarity of illustration, where appropriate, reference numerals may have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

FIG. 1 shows a block schematic diagram of a vehicle 100 incorporating an offroad travel assistance system in accordance with embodiments described herein. In some instances, the vehicle 100 may be configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that can operate in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor(s) of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operably connected to the processor(s) 110 for use thereby. The term "operably connected," as used throughout this description, can include direct or indirect connections, including connections without direct physical contact.

In one or more arrangements, the one or more data stores 115 can include user vehicle configuration information 116. A "user vehicle" may be a vehicle in which a user proposes to traverse an offroad trail. The user may download or otherwise access available offroad trail information from any suitable source. In one or more arrangements, the user may access offroad trail information (or "ride information", defined elsewhere herein) stored on a cloud storage facility 219. In one or more arrangements, the user vehicle may be configured as shown in FIG. 1. "Traversal" of a trail or "traversing" a trail as described herein is understood to mean driving along the trail from a start of the trail to an end of the trail.

The user vehicle configuration is the combination of all systems and components currently installed in the vehicle, including the characteristics of these systems and components. The vehicle configuration (including systems such as the suspension system, braking system, etc., for example) may determine whether the user vehicle is suitable for traversing a given offroad trail. "Vehicle configuration information" is information about the user vehicle configuration which may affect the suitability of the user vehicle for traversing a proposed trail without incurring damage. User vehicle configuration information 116 may include the same types of information which may be acquired as ride information during a vehicle traversing an offroad trail.

User vehicle configuration information 116 may include information such as technical specifications, operating limitations or restrictions and/or any other information specifying conditions under which the user vehicle systems and/or components are intended to operate so as to prevent damage to the user vehicle. In one example of vehicle configuration information, technical specifications for a user vehicle active suspension system may state that a force acting on a component of the suspension system is not to exceed a predetermined value during operation of the vehicle.

The one or more data stores 115 can include the sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operably connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby objects).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100, such as the current geographical location of the vehicle. In one or more arrangements, the vehicle sensor(s) 121 can include a speedometer to determine a current speed of the vehicle 100. The vehicle sensor(s) 121 may include vent status sensors 205 configured for detecting a current status (i.e., closed or open) of one or more of the vehicle vent(s). The vehicle sensor(s) 121 may include vehicle directional sensors 203 configured to determine a current heading of the vehicle or direction in which the vehicle is pointed. In one or more arrangements, vehicle sensor(s) 121 may include any sensors required for the acquisition of any information during traverse of a trail by the user vehicle which may be stored, accessed, and used as ride information by another vehicle which proposes to traverse the trail.

In addition, the sensor system 120 can include one or more environment sensors 122 configured to acquire, and/or sense driving environment data. "Driving environment data" includes data or information about the external environment in which the vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, weather conditions, etc. In one or more arrangements, environment sensor(s) 122 may include any sensors required for the acquisition of any information during traverse of a trail by the user vehicle which may be stored, accessed, and used as ride information by another vehicle which proposes to traverse the trail.

Various examples of sensors of the sensor system 120 are described herein. The example sensors may be part of the one or more environment sensors 122 and/or the one or more vehicle sensors 121. However, it will be understood that the embodiments are not limited to the particular sensors described. The sensor system 120 may include any sensors suitable for and/or required to perform any of the data acquisition and/or vehicle control operations contemplated herein. As an example, in one or more arrangements, the environment sensors 122 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

Information acquired by user vehicle sensors and environmental sensors during traversal of a trail may be usable as ride information by another vehicle evaluating the same trail as a possible ride option. Vehicles travelling an offroad trail may be configured to acquire ride information using existing vehicle sensors and/or sensors specially-purposed for gathering certain types of ride information. Sensors of sensor system 120 may be communicably coupled to the various systems and components of a vehicle, and may be configured to acquire ride information during vehicle travel over an offroad trail. Such information may be uploaded to cloud storage facility 219, or some or all of the information may be buffered in a user vehicle ride information buffer 117 for later transmission to facility 219.

In one or more arrangements, the sensors of the sensor system 120 may be configured to acquire for recordation, processing, and/or storage the types of information (such as forces acting on vehicle components) pertinent to the ability of a vehicle to traverse the offroad trail without damage. In one or more arrangements, the sensors may be configured to acquire, for recordation, processing, and/or storage, information pertinent to the ability of the vehicle systems and components to perform operations necessary to successful traversal of the trail (i.e., from beginning to end). For example, values of various operational parameters of the reference vehicle engine (such as engine torque and/or power characteristics needed to successfully drive portions of the trail) and operational parameters of an all-wheel drive system may be recorded during traversal of a trail, and these values may be compared with operating specifications and other information relating to the user vehicle engine and all-wheel drive systems.

Sensors of the sensor system 120 may be configured to measure pertinent parameters such as forces on vehicle components, vehicle speed, wheel slip, and other parameters may be mounted in suitable locations on the vehicle and communicably coupled to associated vehicle systems and components. The sensors may also be communicably coupled to the vehicle wireless communications interface 169 for transmission to a cloud or other storage facility. The sensors may also be communicably coupled to other vehicle systems and components, such as data stores 115 and processor(s) 110, for storage and processing of vehicle and environmental sensor data.

Sensor system 120 may include sensors configured to detect the current state or status of vehicle systems and components and to generate indications (for example, using trouble codes) possible malfunctions of vehicle systems and components. Sensor system 120 may include sensors configured to detect changes to the user vehicle configuration (for example, due to hardware upgrades and/or vehicle repairs). This information may be used to update the user vehicle configuration information 116.

The vehicle 100 can include an input system 130. An "input system" includes any device, component, system, element or arrangement or groups thereof that enable information/data to be entered into a machine. For example, the input system 130 may include a keypad, a touch screen or other interactive display, a voice-recognition system and/or any other device or system which facilitates communications between a user and the vehicle. The input system 130 can receive an input from a vehicle passenger (e.g., a driver or a passenger) or a user located remotely from the vehicle 100.

The vehicle 100 can also include an output system 135. An "output system" includes any device, component, or arrangement or groups thereof that enable information/data to be presented to a vehicle passenger (e.g., a person, a vehicle passenger, etc.) or a remote user.

The vehicle 100 can include one or more vehicle systems, collectively designated 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle systems 140 can include a propulsion system 141, a braking system 142, a steering system 143, throttle system 144, a suspension system 148, a transmission system 145, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system. The navigation system 147 may be configured to track the path of a vehicle along an offroad trail for recordation in user vehicle ride information buffer 117. The navigation system 147 may be configured to operate in conjunction with the sensor system and other vehicle systems to assign navigational coordinates to various terrain and other features encountered during traversal of an offroad trail. This information may be included in ride information to inform a human user or autonomous driving module of another vehicle which subsequently traverses the same trail. The navigation system 147 may be configured to operate in conjunction with the autonomous driving module to guide the vehicle along an offroad trail selected by a user.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operably connected. The modules can include instructions (e.g., program logic) executable by one or more processor(s) 110. Alternatively, or in addition, one or more of data store(s) 115 may contain such instructions.

Generally, the term "module", as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc. The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 can be configured to determine travel path(s), current autonomous driving maneuvers for the vehicle 100, future autonomous driving maneuvers and/or modifications to current autonomous driving maneuvers based on data acquired by the sensor system 120 and/or information received from a navigation system, such as navigation system 147. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

The autonomous driving module(s) 160 may be configured to autonomously control the user vehicle so as to drive the vehicle to an offroad trail. The autonomous driving module may be configured to use a sequence of predetermined navigational coordinates to autonomously control the user vehicle so as to drive the vehicle along the offroad trail. The sequence of predetermined navigational coordinates may be extracted from ride information relating to a previous traversal of the trail by a reference vehicle as described herein. In one or more arrangements, the autonomous driving module may also be configured to match a speed profile of the reference vehicle along the trail during the previous traversal of the trail, using speed profile data obtained from the ride information.

The processor(s) 110, the user vehicle configuration evaluation module 111, the vehicle configuration modification module 113, and/or the autonomous driving module(s) 160 can be operably connected to communicate with the other elements of the vehicle, including various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110 and/or the autonomous driving module(s) 160 may control some or all of these vehicle systems 140 and, thus, may be partially or fully autonomous.

The processor(s) 110 and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110 and/or the autonomous driving module(s) 160 can control the direction and/or speed of the vehicle 100. The processor(s) and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The autonomous driving module(s) 160 may include computer-readable instructions that when executed by the one or more processors cause the one or more processors to enable a user to instruct the autonomous driving module(s) to automatically autonomously operate the user vehicle 100 so as to traverse the offroad trail if the user vehicle configuration information 116 is determined to be consistent with the ride information, as described herein.

The autonomous driving module(s) 160 may further include computer-readable instructions that when executed by the one or more processors cause the one or more processors to enable a user to instruct the autonomous driving module to automatically autonomously operate the user vehicle so as to traverse the offroad trail if the user overrides the autonomous control of the at least one element of the vehicle directed to preventing operation of the vehicle to begin to drive the offroad trail, as described herein.

The offroad travel assistance system 109 can include a vehicle configuration evaluation module 111. In one or more embodiments, the vehicle configuration evaluation module 111 may include computer-readable instructions that, when executed by the processor(s) 110, cause the processor(s) to determine if user vehicle configuration information 116 describing one or more aspects of the user vehicle 100 is consistent with similar ride information describing a traversal of a given offroad trail by a reference vehicle. To determine if the user vehicle configuration information 116 is consistent with similar ride information, the vehicle configuration evaluation module 111 may include instructions that when executed by the one or more processor(s) 110 cause the one or more processors to compare one or more portions of the user vehicle configuration information 116 to one or more similar portions of the ride information, as described herein.

A "reference vehicle" may be any vehicle which previously successfully completed the proposed trail and regarding which ride information was acquired during the successful traversal of the proposed trail. In one or more arrangements, the reference vehicle may be a vehicle different from the user vehicle. A "proposed trail" may be an offroad trail which is being considered by a user for driving with the user vehicle 100, and for which ride information has been acquired by one or more reference vehicles. The vehicle configuration evaluation module 111 may include computer-readable instructions that, when executed by the processor(s) 110, cause the processor(s) to, in a manner described herein, compare ride information relating to a proposed trail and acquired by a reference vehicle with similar user vehicle configuration information 116 to determine if the user vehicle is configured to traverse the proposed trail.

An offroad trail may be defined by a continuous or connected sequence of GPS of other navigational coordinates traversed by a vehicle during a single ride of the vehicle. Traversal of an offroad trail may be defined as a successful autonomous, manual, and/or semi-autonomous driving of the trail by a reference vehicle, from a start location of the trail to an end location of the trail. A successful traversal of the trail may be a traversal from trail start to trail end without incurring damage to the vehicle along the trail.

"Ride information" may include any information pertinent to the requirements a vehicle must meet in order to successfully traverse a given offroad trail. For purposes of comparison with user vehicle configuration information 116 (described below), ride information may relate to a single successful traversal of a particular offroad trail by a particular reference vehicle. Ride information may include records of operations performed by and/or on a system or component of the reference vehicle during traversal of the offroad trail. Ride information may include information about affirmative actions taken by the reference vehicle and also about events experienced by the reference vehicle during the traversal of the offroad trail. One example of an affirmative action taken by the vehicle may include a velocity profile (i.e., a record of the vehicle velocity) as produced by the vehicle engine and transmission during driving of the trail.

An example of an event experienced by the vehicle may be a shock loading of an element of the suspension system due to an unseen ground depression in the path of the vehicle, which may result in a force applied to an element of the reference vehicle suspension system.

Non-exclusive examples of ride information include information about the physical characteristics (e.g., ground conditions or terrain, obstacles, etc.) of a proposed trail previously traversed by a reference vehicle, information about operations of the reference vehicle during a successful traversal of the offroad trail (including for example, information on forces, temperatures, and values of other vehicle component and system parameters experienced by component(s) and/or system(s) of the reference vehicle during the ride), information about environmental and weather conditions occurring during the successful traversal of the offroad trail by the reference vehicle, and information (such as operating specifications) about the structure and capabilities of the reference vehicle systems and components. Other types of ride information may also be acquired, received and/or analyzed.

Ride information may be provided by vehicle internal sensors configured to acquire and/or receive data from vehicle systems and components during traversal of the trail. Ride information may also be provided by vehicle environmental sensors configured to acquire and/or receive data relating to an external environment of the vehicle. Such information may include ambient weather information and trail terrain information. Environmental sensors may include radar systems and lidar systems for detecting trail terrain features and obstacles, temperature sensors, sensors for detecting ambient moisture levels, and other types of sensors. Various types of ride information (such as weather information) may be acquired by the reference vehicle from sources outside the vehicle, for example satellite imaging of the offroad trail and sources of current weather information relating to the trail. Various types of ride information may also be acquired by the reference vehicle before commencement of the ride and/or during the ride.

Non-exclusive examples of pertinent types of ride information may include braking system information, active suspension system information, propulsion system information, steering system information, transmission system information, tire pressure information, and any other type of pertinent information. Braking system information may include, for example, braking profiles (i.e., progressions of braking forces applied to each vehicle wheel during traversal of the trail). The braking profile information may be correlated with GPS or other navigational coordinates along the trail, to provide a record of the braking forces that were applied by the reference vehicle braking system at various locations on the trail. Braking system information may include magnitudes of the braking forces, rates of application of braking forces, braking system response times between determination of a need to apply a braking force and actual application of the force, and data relating to other pertinent braking parameters. The values of such parameters experienced by the reference vehicle may be compared with similar parameters of the user vehicle to help assess the feasibility of the user vehicle driving the trail.

Braking system information may also include information relating to the condition of the reference vehicle brakes when the trail was traversed by the reference vehicle. Such information may be provided by brake sensors and other suitable sensors. If a comparison of the user vehicle configuration information 116 related to braking with the similar reference vehicle braking system information reveals that the user vehicle braking system and/or components are incapable of performing the braking operations performed by the reference vehicle braking system/components, or that operating specification limits of the user vehicle braking system and/or components may be exceeded during traversal of the trail, the vehicle configuration evaluation module may determine that the user vehicle configuration information 116 is not consistent with the similar ride information. For example, an element of the user vehicle braking system may be incapable of exerting a force equal to a force exerted by a corresponding element of the reference vehicle braking system during traversal of the offroad trail. In such a case, the vehicle configuration evaluation module may be configured to determine that the user vehicle configuration information 116 is not consistent with the similar ride information based on a determination based on an assumption that the user vehicle brakes may not be able to adequately stop or slow the user vehicle as needed at one or more locations along the trail.

Active suspension system information may include, for example, information relating to the structure, capabilities, and components of the active suspension system, and input forces applied to components such as shock absorbers during traversal of the trail. For example, a mono-tube shock absorber may react differently than an external reservoir shock absorber to an applied input force. In addition, shock absorbers of the same type may be structured to withstand different levels of input force without damage. If an input force previously applied to a reference vehicle shock absorber during traversal of a trail may exceed operating specifications of a user vehicle shock absorber, the vehicle configuration evaluation module may determine that the user vehicle configuration information 116 is not consistent with the similar ride information.

Propulsion system information may include information such as applied engine torque profiles and records of other aspects of engine performance during traversal of the trail by the reference vehicle. Such information may be compared with similar user vehicle information, such as engine operating specifications. In one example, if a torque value or torque profile generated by the reference vehicle engine during traversal of the proposed trail cannot be reproduced by the user vehicle engine or is incompatible with safe (i.e., non-damaging) operation of the user vehicle engine, the vehicle configuration evaluation module may determine that the user vehicle configuration information 116 is not consistent with the similar ride information.

Transmission system ride information may include, for example, data relating to operations of a reference vehicle all-wheel drive system and its components during traversal of the trail and other pertinent transmission information. Such information may be compared to similar information regarding the user vehicle transmission system. For example, the ride information may include a record of transmission temperature during traversal of the trail by the reference vehicle. The vehicle configuration evaluation module 11 may be configured to compare the maximum transmission temperature allowable in the user vehicle (as set forth in pertinent operating specifications) with the maximum transmission temperature experienced by the reference vehicle during the previous traversal of the trail.

Pertinent types of ride information may also include various types of sensor data. For example, a reference vehicle may include sensors configured to acquire pertinent data on physical characteristics of the offroad trail during trail traversal, or on reference vehicle system and/or component operations during traversal. The pertinent data may be data relevant to the ability of the user vehicle to traverse the trail without damage.

In one particular example, a reference vehicle may include a temperature sensor operably coupled to a vehicle system. If ride information indicates that a temperature of a component of the reference vehicle system rises to a level above a recommended maximum temperature of a corresponding component of the user vehicle during traversal of the trail, the vehicle configuration evaluation module may determine that the user vehicle configuration information 116 is not consistent with the similar ride information because of the possibility that the user vehicle component will become damaged if it also reaches the elevated temperature. If the user vehicle sensors are not configured to acquire such data (for example, due to lack of sensor resolution, range, etc., or because pertinent sensors are not installed in the user vehicle), the vehicle configuration evaluation module may determine that the user vehicle configuration information 116 is not consistent with the similar ride information.

In another example, tire pressure sensors may detect that tire pressure in one or more user vehicle tires is insufficient to enable the trail to be traversed without possibly damaging the vehicle.

In one or more arrangements, for purposes of comparing data from different models or types of corresponding vehicle systems or components in the user and reference vehicles, the vehicle configuration evaluation module may be configured to search for data and/or parameter values in the ride information and corresponding user vehicle configuration information which are pertinent to the ability of the user vehicle to traverse the proposed offroad trail without damaging the user vehicle.

Ride information relating to a particular vehicle system (such as suspension, braking, etc.) or component (e.g., a left front wheel shock absorber) may be stored in one or more data records tagged or labeled so as to associate any applicable data with that vehicle system or component. The ride information may be tagged as generated and/or transmitted for storage in a cloud storage facility so as to associate the information with a particular vehicle system and/or component. User vehicle configuration information 116 relating to a given user vehicle system or component may be similarly labeled or tagged for storage in vehicle data stores. This categorization may speed computer identification of and access to particular types of information, and may also facilitate comparison between user vehicle configuration information 116 and similar reference vehicle ride information.

In one or more arrangements, parameters pertinent to traversal of an offroad trail may be identified, and user vehicle data and other information relating to these parameters may be pre-processed into a form which facilitates comparison with the responses and performance of reference vehicle components and systems during traversal of the offroad trail. Such parameters may include, for example, engine torque, ground clearance, tire or wheel diameter, shock forces on suspension system components, system and component temperatures, and any of a variety of other parameters. Such user vehicle information may be obtained from user vehicle operating and other specifications and/or from other sources. The pre-processed user vehicle information may be stored in user vehicle configuration information 116. Aids such as conversion tables, formulae, lookup tables and other sources of information may be generated and compiled to aid in reference vehicle/user vehicle parameter comparisons. The vehicle configuration evaluation module 111 may be configured to survey available ride information for values of the parameters pertinent to traversal of an offroad trail. The vehicle configuration evaluation module 111 may be configured to compare the values of any such parameters available from ride information with the pre-processed user vehicle information. Based on these comparisons, the vehicle configuration evaluation module 111 may determine if the user vehicle configuration information is consistent with the ride information.

In one or more arrangements, for purposes described herein, user vehicle configuration information 116 may be considered consistent with ride information similar to the user vehicle configuration information 116 if, upon comparison of the user vehicle configuration information 116 with the ride information, it is determined that the systems and/or components of the user vehicle are capable of acting and reacting to traversal of the trail so as to prevent damage to the user vehicle. For example, user vehicle configuration information (such as operating specifications) relating to shock loads on a left-front shock absorber of the user vehicle suspension may be considered consistent with ride information relating to shock loading experienced by a left-front shock absorber of the reference vehicle during traversal of the trail if the user vehicle shock absorber can withstand the loading experienced by the reference vehicle shock absorber without damage.

In one or more arrangements, for purposes of comparison, portions of ride information and user vehicle configuration information 116 may be considered "similar" if the portions of the ride information and the user vehicle configuration information relate to the same measurable parameter or characteristic of the same components (or analogous components) in both the reference and user vehicles. In particular embodiments, similar portions of ride information and user vehicle configuration information 116 may be measured in the same units (for example, pounds force).

In one or more arrangements, the vehicle configuration evaluation module 111 may be configured to compare portions of the user vehicle configuration information 116 with similar portions of the ride information to determine if the user vehicle is currently configured for traversing an offroad trail described by the ride information. For example, the vehicle configuration evaluation module may be configured to acquire, extract, or derive a profile or progression of the forces acting on a left-front wheel shock absorber of a suspension system of a reference vehicle during traversal of an offroad trail, from ride information relating to the traversal. The vehicle configuration evaluation module 111 may be configured to compare features of this force profile with user vehicle configuration information (such as technical specifications of the user vehicle left-front wheel shock absorber, for example) describing the limits of the forces to which a left-front wheel shock absorber of the user vehicle suspension may be subjected.

In one or more arrangements, the vehicle configuration evaluation module 111 may be configured to assume that the user vehicle suspension system would experience the same operational loads experienced by the reference vehicle suspension system during traversal of the offroad trail. If (according to a profile of forces experienced by a reference vehicle shock absorber) the maximum force to which a corresponding user vehicle suspension system shock absorber may be subjected during traversal of the trail exceeds the maximum allowable force on the user vehicle shock absorber, the user vehicle shock absorber may be damaged in attempting to traverse the offroad trail. In such a case, the vehicle configuration evaluation module 111 may determine that the current user vehicle configuration is not consistent with the similar ride information. In this case, the current vehicle configuration may be considered unsuitable for traversing the trail.

In another example, the ride information may include a record of transmission temperature during traversal of the trail by the reference vehicle. The vehicle configuration evaluation module 111 may be configured to compare the maximum allowable transmission temperature allowable in the user vehicle (as set forth in pertinent operating specifications) with the maximum transmission temperature experienced by the reference vehicle during the previous traversal of the trail. If the maximum reference vehicle transmission temperature exceeds the maximum allowable user vehicle transmission temperature, the vehicle configuration evaluation module 111 may determine that the current user vehicle configuration is not consistent with the similar ride information. In this case, the current vehicle configuration may be considered unsuitable for traversing the trail.

In the manner described above, various types of user vehicle configuration information may be compared with similar types of the ride information relating to previous traversal of an offroad trail by a reference vehicle to determine if the user vehicle 100 is configured for traversing the offroad trail described by the ride information. The vehicle configuration evaluation module 111 may be configured to identify, associate and/or compare similar types of parameter information from the user vehicle configuration information 116 and the ride information.

The vehicle configuration evaluation module 111 may be configured to acquire and/or receive ride information from a cloud storage facility 219 or other storage facility via a wireless communications interface 169. The vehicle configuration evaluation module 111 may be configured to acquire and/or receive (from data stores 115, for example) user vehicle configuration for comparison with available ride information. If needed, one or more buffers may be configured for storing elements of ride information and/or user vehicle configuration information 116 during the comparison process, to facilitate rapid and efficient comparison.

The vehicle configuration evaluation module 111 may also include instructions that when executed by the one or more processor(s) 110 cause the one or more processors to, responsive to a determination that the configuration information is not consistent with the ride information, autonomously control at least one portion of the vehicle so as to prevent operation of the vehicle to traverse the offroad trail. "At least one portion of the user vehicle" may include any component, system, or combination of components and systems of the user vehicle that may be autonomously controlled to prevent movement onto and/or along the trail.

The vehicle configuration evaluation module 111 may be configured to interface or interact with the autonomous driving module(s) 160 to prevent manual operation of the vehicle 100 by the user to attempt to drive the trail. This user vehicle control function may be directed to preventing damage to the vehicle in cases where the vehicle configuration evaluation module 111 has determined that the user vehicle configuration information is not consistent with the ride information. Riding of the user vehicle 100 along the proposed trail in such cases may cause damage to the vehicle. Therefore, in such cases, the vehicle configuration evaluation module 111 may control operation of one or more elements of the vehicle 100 to prevent the trail from being driven. This user vehicle control function may also be directed to preventing the user vehicle 100 from being stopped or "stuck" on a trail because the user vehicle is not equipped to traverse a trail having the physical characteristics of the trail selected by the user.

Operation of the user vehicle 100 may be controlled so as to prevent the vehicle from entering or traveling along any portion (including a beginning) of the offroad trail. Operation of the user vehicle 100 to traverse the offroad trail may be prevented in any of several ways.

In one or more arrangements, one or more elements of the transmission system 145 may be controlled so as to prevent driving of the user vehicle 100 onto navigational coordinates coincident with any portion of the trail, including coordinates coincident with a start of the trail. This function may prevent the user vehicle 100 from entering the trail, whether the vehicle is being driven manually or autonomously responsive to a human user command to drive the trail or to drive onto coordinates coincident with a portion of the trail.

In another arrangement, one or more elements of the user vehicle throttle system 144 may be controlled so as to prevent driving of the vehicle onto navigational coordinates coincident with any portion of the trail. The throttle system 144 may be controlled so as to prevent fuel flow to the vehicle engine responsive to an attempt by a human driver to drive onto coordinates coincident with a portion of the trail, or responsive to a command from a human user to autonomously drive the vehicle onto coordinates coincident with a portion of the trail. Control of one or more other vehicle systems and/or elements may be used to prevent the vehicle from riding onto the trail, or simultaneous control of a combination of vehicle systems and/or elements may be used.

In one or more arrangements, to determine if user vehicle configuration information 116 is consistent with ride information similar to the vehicle configuration information, the vehicle configuration evaluation module 111 may include instructions that when executed by the one or more processor(s) 110 cause the one or more processors to compare user vehicle configuration information including at least one operating specification of a system of the user vehicle with ride information relating to operations of a corresponding system of the reference vehicle during traversal of the offroad trail by the reference vehicle. Also, the vehicle configuration evaluation module 111 may include instructions that when executed by the one or more processor(s) 110 cause the one or more processors to, if any operation of the corresponding system of the reference vehicle during traversal of the offroad trail by the reference vehicle is outside an operating specification of the system of the vehicle, determine that the user vehicle configuration information is not consistent with the ride information.

For purposes described herein, a system may be defined as a combination of two or more components, operably coupled together or directly attached to each other, which combine or cooperate to perform some function in the vehicle. A system of the reference vehicle "corresponding to" a system of the user vehicle may be a system which performs the same function as the user vehicle system. Similarly, if a reference vehicle system corresponds to a system of the user vehicle, the user vehicle system also "corresponds to" the reference vehicle system. Examples may include a suspension system of the reference vehicle (which corresponds to a suspension system of the user vehicle and vice versa) and any of the other vehicle systems shown in FIG. 1 and/or discussed herein which are present in both the reference vehicle and the user vehicle.

"Operations" of a corresponding system of the reference vehicle may include any actions performed by the corresponding system during traversing of the trail (for example, absorption of input forces by the reference vehicle suspension system, adjustment of torque applied to a vehicle wheel by an all-wheel drive system responsive to ground conditions, and other actions and reactions of the system during traversing the trail). Selection of the user vehicle and ride information or reference vehicle operating parameters to be compared may be informed by the operating specifications of the user vehicle which are pertinent to traversing the trail. Pertinent operating limits and conditions of the user vehicle systems may be identified, flagged, and formatted/pre-processed during configuration of the offroad travel assistance system, for purposes of comparison with related parameters of reference vehicle systems as recorded during traversal of the trail by the reference vehicle. That is, operating specifications of the user vehicle and other information which is pertinent to traversing the trail may be identified prior to configuration of the offroad travel assistance system. This information may be formatted and stored in the user vehicle configuration information data store so as to facilitate rapid comparison with similar portions of the ride information. In addition, ride information stored in a cloud facility or other location may be formatted/pre-processed to facilitate comparison with user vehicle configuration information. This pre-processing may, for example, identify and/or extract key values of pertinent parameters (such as forces) from the ride information and format this information to speed comparisons with user vehicle configuration information. Elements of the offroad travel assistance system may be configured to extract available information relating to these pertinent parameters from the ride information.

Operation of a system of the reference vehicle outside an operating specification of a system of the user vehicle may be considered to occur when operation of the reference vehicle system exceeds one or more limits or conditions of the operating specification (for example, in a case where an input force exerted on a component of the reference vehicle suspension system would exceed a maximum allowable force on a corresponding component of the user vehicle suspension system (as defined by an applicable operating specification).

In another example, operation of a system of the reference vehicle outside an operating specification of a system of the user vehicle may occur when a response (or the magnitude of a response) performed by reference vehicle system to trail conditions during traversal of the offroad trail exceeds an operating specification of the corresponding system of the user vehicle. For example, as stated previously, values of various operational parameters of the reference vehicle engine and all-wheel drive systems may be recorded during traversal of a trail, and these values may be compared with operating specifications and other information relating to the user vehicle engine and all-wheel drive systems. If any values of reference vehicle operational parameters appear to be outside related operating specifications of the user vehicle engine and/or all-wheel drive systems, the vehicle configuration evaluation module may determine that the user vehicle may not be currently equipped to perform certain operations necessary to traverse the offroad trail. In this case, the user vehicle configuration evaluation module may determine that the user vehicle configuration information is not consistent with the ride information.

If it is determined that any operation of a system of the reference vehicle during traversal of the offroad trail by the reference vehicle is outside an operating specification of a corresponding system of the user vehicle, information relating to the relevant user and reference vehicle systems may be stored in a non-consistent system buffer 187. Such information may include element(s) of the user vehicle system operating specification(s) which are exceeded by the ride information, associated operating specification limits (as determined from the ride information) which may be necessary to traverse the trail, and any other information usable for informing a user as to the specific capabilities required of the relevant vehicle system in order to successfully traverse the trail, and why the relevant system as currently installed in the user vehicle may be inadequate for purposes of traversing the trail. This information may be used to inform the user as to why the current configuration of the user vehicle is considered to be unsuitable for traversing the trail, and as to possible user vehicle modifications which may be implemented to make the user vehicle more suitable for riding the trail.

In some cases, the operating specification in question may relate to a response of the total user vehicle system and may not be attributable to a single component of the system. In such a case, in reconfiguring the user vehicle for traversing the trail as described herein, it may be necessary to replace the entire system of the user vehicle with another, compatible vehicle system which performs the same function and also has operating specifications which may meet the demands of the proposed trail as indicated by the ride information.

In one or more arrangements, to determine if user vehicle configuration information is consistent with ride information similar to the vehicle configuration information, the vehicle configuration evaluation module 111 may include instructions that when executed by the one or more processor(s) 110 cause the one or more processors to compare user vehicle configuration information 116 including at least one operating specification of a component of the user vehicle with ride information relating to operations of a corresponding component of the reference vehicle during traversal of the offroad trail by the reference vehicle.

Also, the vehicle configuration evaluation module 111 may include instructions that when executed by the one or more processor(s) 110 cause the one or more processors to, if any operation of the corresponding component of the reference vehicle during traversal of the offroad trail by the reference vehicle is outside an operating specification of the component of the user vehicle 100, determine that the user vehicle configuration information is not consistent with the ride information.

In some cases, the operating specification in question may relate to a response of a single component of the user vehicle. In such a case, in reconfiguring the user vehicle for traversing the trail as described herein, it may be sufficient to simply replace the user vehicle component with another, compatible component which performs the same function and also has operating specifications which may meet the demands of the proposed trail as indicated by the ride information.

A "component" may be a part of a larger whole, such as a system or the vehicle as a whole. For example, a shock absorber may be considered a component of a passive suspension system, and an actuator (such as a hydraulic actuator) may be considered a component of an active suspension system. A component of the reference vehicle "corresponding to" a component of the user vehicle may be a component which performs the same function as the user vehicle component. If a reference vehicle component corresponds to a component of the user vehicle, the user vehicle component also "corresponds to" the reference vehicle component. The component function may be associated with a particular part or system of the vehicle. For example, a left-front shock absorber on the reference vehicle may correspond to a left-front shock absorber of the user vehicle, and a right-front shock absorber on the reference vehicle may correspond to a right-front shock absorber of the user vehicle.

For example, if a shock load applied to a left-front shock absorber of the reference vehicle during traversal of the trail exceeds a maximum allowable shock loading of a left-front shock absorber of the user vehicle 100, the vehicle configuration evaluation module 111 may determine that the user vehicle left-front shock absorber may not be capable of withstanding the shock loads that would be experienced during traversal of the trail, without causing damage to the shock absorber. In this case, the user vehicle configuration evaluation module 111 may determine that the user vehicle configuration information is not consistent with the ride information.

If it is determined that any operation of a component of the reference vehicle during traversal of the offroad trail by the reference vehicle is outside an operating specification of a corresponding component of the user vehicle, information relating to the relevant user and reference vehicle components may be stored in a non-consistent component buffer 185. Such information may include element(s) of the user vehicle component operating specification(s) which are exceeded by the ride information, associated operating specification limits (as determined from the ride information) which may be necessary to traverse the trail, and any other information usable for informing a user as to the specific capabilities required of the relevant vehicle component in order to successfully traverse the trail, and why the relevant component as currently installed in the user vehicle may be inadequate for purposes of traversing the trail. This information may be used to inform the user as to why the current configuration of the user vehicle is considered to be unsuitable for traversing the trail, and as to possible user vehicle modifications which may be implemented to make the user vehicle more suitable for riding the trail.

In one or more arrangements, the vehicle configuration evaluation module 111 may include instructions that when executed by the one or more processor(s) 110 cause the one or more processors to, responsive to a determination that the configuration information is not consistent with the ride information, generate a message indicating that a current configuration of the user vehicle has been determined to be unsuitable for traversing the offroad trail. The message may include a reason why the user vehicle configuration has been determined to be unsuitable for traversing the offroad trail, including reference(s) to specific user vehicle system(s) and/or component(s) which have been determined to be unsuitable for traversing the proposed trail. The message may be sent to a user via the output system 135 and/or using any other suitable method. For example, the message may be sent to a user via cellular device.

The user vehicle configuration evaluation module 111 may include instructions that when executed by the one or more processor(s) 110 cause the one or more processors to, responsive to autonomous control of at least one portion of the user vehicle 100 so as to prevent operation of the user vehicle to traverse the offroad trail, enable a user to override or bypass the autonomous control of the portion(s) of the user vehicle directed to preventing operation of the vehicle to begin to drive the offroad trail. The vehicle configuration evaluation module 111 may enable the user to override the autonomous control by, for example, generating a prompt to the user enabling the user to select, as an option, that the autonomous control be overridden to enable the user to manually drive the user vehicle 100 or to instruct the autonomous driving module(s) 160 to autonomously drive the user vehicle 100 along the trail. This capability enables a user to elect to attempt to traverse a trail despite a determination by the user vehicle configuration evaluation module 111 that the user vehicle 100 is not currently configured for traversing the trail. The override option may be in the form of a message via the vehicle output system 135 and/or using another messaging method. The user may be enabled to override autonomous control of the vehicle to prevent attempting to traverse the trail by voice command, touch screen, or any other suitable command method using the vehicle input system 130, for example, or another mechanism.

The user vehicle configuration evaluation module 111 may include computer-readable instructions that when executed by the one or more processor(s) 110 cause the one or more processors to autonomously operate the user vehicle 100 so as to traverse the offroad trail. In one or more arrangements, the vehicle configuration evaluation module 111 may include computer-readable instructions that when executed by the one or more processor(s) 110 cause the one or more processors to control the autonomous driving module(s) 160 to autonomously control operation of the user vehicle so as to traverse the offroad trail responsive to a user overriding the autonomous control of element(s) of the vehicle directed to preventing operation of the vehicle to begin to drive the offroad trail. In one arrangement, the autonomous driving module(s) 160 may initiate control of the user vehicle 100 to traverse the trail after the user manually drives the user vehicle to a location within a predetermined distance of a start of the trail. In another arrangement, the user may instruct the autonomous driving module(s) 160 to autonomously drive the user vehicle 100 to the start of the trail, after which the autonomous driving module may continue to drive the user vehicle 100 along the trail. Operation of the autonomous driving module(s) 160 to drive the user vehicle 100 may be manually discontinued at any time by user command.

In one or more arrangements, the vehicle configuration evaluation module 111 may further include instructions that when executed by the one or more processor(s) 110 cause the one or more processors to enable a user to instruct the autonomous driving module(s) 160 to automatically autonomously operate the user vehicle so as to traverse the offroad trail if the user overrides an autonomous control of the vehicle directed to preventing operation of the vehicle to begin to drive the offroad trail. For example, the vehicle configuration evaluation module 111 may cause generation of a prompt to the user offering the user a choice as to whether the autonomous driving module(s) 160 is to automatically autonomously operate the user vehicle 100 so as to traverse the offroad trail if the user overrides the autonomous control of the vehicle preventing driving of the trail. If the user instructs the autonomous driving module(s) 160 to automatically autonomously operate the user vehicle 100 to traverse the trail if an override command is issued, the autonomous driving module(s) 160 may initiate autonomous control of the vehicle 100 when the vehicle is within a predetermined distance of the start of the trail, or the autonomous driving module(s) may autonomously drive the user vehicle 100 to the trail and continue driving the vehicle along the trail. The user may be prompted to select one of these two additional control options or other option(s).

In one or more arrangements, the vehicle configuration evaluation module 111 may control the autonomous driving module(s) 160 to autonomously control operation of the user vehicle 100 so as to traverse the offroad trail responsive to a determination that the configuration information is consistent with the associated ride information. In one arrangement, the autonomous driving module(s) 160 may initiate control of the user vehicle 100 to traverse the trail after the user manually drives the user vehicle to a location within a predetermined distance of a start of the trail. In another arrangement, the user may instruct the autonomous driving module to autonomously drive the user vehicle 100 to the start of the trail, after which the autonomous driving module continues to drive the user vehicle along the trail. Operation of the autonomous driving module(s) 160 to drive the user vehicle 100 may be manually discontinued at any time by user command.

In one or more arrangements, the vehicle configuration evaluation module 111 may further include instructions that when executed by the one or more processor(s) 110 cause the processor(s) to enable a user to instruct the autonomous driving module(s) 160 to automatically autonomously operate the user vehicle 100 so as to traverse the offroad trail if the user vehicle configuration information is determined to be consistent with the ride information. For example, the vehicle configuration evaluation module 111 may prompt the user to offer the user a choice as to whether the autonomous driving module(s) 160 is to automatically autonomously operate the user vehicle 100 so as to traverse the offroad trail if the user vehicle configuration information is determined to be consistent with the ride information. If the user instructs the autonomous driving module(s) 160 to automatically autonomously operate the user vehicle 100 to traverse the trail if the user vehicle configuration information 116 is determined to be consistent with the ride information, the autonomous driving module(s) 160 may initiate autonomous control of the vehicle 100 when the vehicle is within a predetermined distance of the start of the trail, or the autonomous driving module may autonomously drive the user vehicle to the trail and continue driving the vehicle along the trail. The user may be prompted to select one of these two additional control options.

In another aspect, the vehicle configuration evaluation module 111 may include computer-readable instructions that when executed by the processor(s) cause the processor(s) 110 to review the ride information (especially reference vehicle sensor information) for "special conditions" which may indicate a need for supplemental system(s) and/or component(s) (i.e., system(s) and/or component(s) in addition to the systems and/or components already installed in the user vehicle). Such supplemental equipment may be differentiated from existing systems and/or components already installed in the user vehicle and which may need to be upgraded or replaced in accordance with the determinations of alternative corresponding user vehicle system(s) and/or component(s) by the vehicle configuration modification module 111 as described herein.

Information regarding possible special conditions searchable by the vehicle configuration evaluation module 111 may be stored in data stores 115 and may be updated by downloading from a cloud source or by using other methods.

The vehicle configuration evaluation module 111 may include computer-readable instructions that when executed by the processor(s) 110 cause the processor(s) 110 to, if it is determined that the reference vehicle experienced a special condition, determine if the current configuration of the user vehicle may enable the user vehicle to traverse the trail in spite of the special condition.

To aid in evaluating feasibility of the user vehicle traversing the trail, look-up tables may be used to correlate each listed special condition with pertinent user vehicle system(s), component(s), and operating specifications which may be relevant to whether or not the user vehicle can traverse the trail as currently equipped, in spite of the special condition(s). The detected special condition may be compared to the user vehicle information to determine if the user vehicle specifications are exceeded or if the reference vehicle was exposed to conditions that the user vehicle may find unsuitable or undesirable.

The vehicle configuration evaluation module 111 may include computer-readable instructions that when executed by the processor(s) 110 cause the processor(s) 110 to, if the current configuration of the user vehicle does not enable the user vehicle to traverse the trail in spite of the special condition, determine that the user vehicle configuration information is not consistent with the ride information. If it is determined that the user vehicle configuration information is not consistent with the ride information, then after the vehicle configuration evaluation module 111 has completed checking for special conditions, operation of the user vehicle may be controlled as described elsewhere herein to prevent the vehicle from attempting to traverse the proposed trail.

In one or more arrangements, the offroad travel assistance system 109 may also include a vehicle configuration modification module 113 including instructions that when executed by the one or more processor(s) 110 cause the one or more processors to, responsive to a determination that an operation of the corresponding system of the reference vehicle during traversal of the offroad trail is outside at least one operating specification of the system of the user vehicle, determine at least one alternative corresponding system compatible with the user vehicle and operable such that the operation of the corresponding system of the reference vehicle during traversal of the offroad trail would be within an operating specification of the alternative corresponding system when the alternative corresponding system is substituted in the user vehicle for the system of the user vehicle. This helps ensure that an alternative corresponding system will be able to operate under conditions experienced while traversing the offroad trail, without damage to the user vehicle.

The vehicle configuration evaluation module 111 may be configured to, either alone or in conjunction with the vehicle configuration modification module 113, determine if an alternative corresponding system compatible with the user vehicle and which is operable such that the operation of the corresponding system of the reference vehicle during traversal of the offroad trail would be within an operating specification of the alternative corresponding system. This may be done with reference to the user vehicle configuration information, the ride information, and the information stored on the alternative vehicle system/component directory 189. The vehicle configuration modification module 113 may also include instructions that when executed by the one or more processor(s) 110 cause the one or more processor(s) to generate a message identifying the at least one alternative corresponding system. These functions may inform a user as to options for modifying the user vehicle to better equip the vehicle for traversing the proposed trail, as previously described.

An "alternative corresponding user vehicle system" may be a system which performs the same function as a user vehicle system, and which is also configured (or may be configured) for installation in the user vehicle. However, the alternative corresponding user vehicle system may have an associated operating specification which encompasses the operation of the corresponding reference vehicle system (i.e., installation in the user vehicle of the alternative corresponding user vehicle system may enable the alternative corresponding user vehicle system to perform the operation performed by the reference vehicle system and which is outside the operating specification of the current corresponding user vehicle system). The vehicle configuration modification module 113 may advise a user as to an alternative corresponding user vehicle system which, if installed in the user vehicle, may enable the user vehicle to traverse the selected trail. The alternative corresponding user vehicle system may be identified in any suitable manner, for example, by a name of the system or a model number of the system. An alternative corresponding user vehicle system is compatible with the user vehicle when the alternative corresponding user vehicle system may be physically substituted for an existing, corresponding user vehicle system performing the same function.

In one or more arrangements, the vehicle configuration modification module 113 may include instructions that when executed by the one or more processor(s) 110 cause the one or more processors to, responsive to a determination that an operation of a corresponding component of the reference vehicle during traversal of the offroad trail is outside at least one operating specification of the component of the user vehicle, determine at least one alternative corresponding component compatible with the user vehicle and operable such that the operation of the corresponding component of the reference vehicle during traversal of the offroad trail is within an operating specification of the alternative corresponding component when the alternative corresponding component is substituted in the user vehicle for the component of the user vehicle. This helps ensure that an alternative corresponding component will be able to operate under conditions experienced while traversing the offroad trail, without damage to the user vehicle.

The vehicle configuration evaluation module 111 may be configured to, either alone or in conjunction with the vehicle configuration modification module 113, determine if an alternative corresponding component compatible with the user vehicle is operable such that the operation of the corresponding component of the reference vehicle during traversal of the offroad trail would be within an operating specification of the alternative corresponding component. This may be done with reference to the user vehicle configuration information, the ride information, and the information stored on the alternative vehicle system/component directory 189. The vehicle configuration modification module 113 may also include instructions that when executed by the one or more processors 110 cause the one or more processors to generate a message identifying the at least one alternative corresponding component.

An "alternative corresponding user vehicle component" may be a component which performs the same function as a user vehicle component, and which is also configured (or may be configured) for installation in the user vehicle. However, the alternative corresponding user vehicle component may have an associated operating specification which encompasses the operation of the corresponding reference vehicle component (i.e., installation in the user vehicle of the alternative corresponding user vehicle component may enable the alternative corresponding user vehicle component to perform the operation performed by the reference vehicle component and which is outside the operating specification of the current corresponding user vehicle component). The vehicle configuration modification module 113 may advise a user as to an alternative corresponding user vehicle component which, if installed in the user vehicle, may enable the user vehicle to traverse the selected trail. The alternative corresponding user vehicle component may be identified in any suitable manner, for example, by a name of the component or a model number of the component.

An alternative corresponding user vehicle component is compatible with the user vehicle when the alternative corresponding user vehicle component may be physically substituted for an existing, corresponding user vehicle component performing the same function. A library (not shown) of various user vehicle systems and component information may be stored in the vehicle data stores for access by the vehicle configuration modification module 113. Alternatively, the library may be stored on a cloud storage facility 219 for access by the vehicle configuration modification module. Information on various characteristics of the user vehicle systems may be stored. A non-exclusive list of such characteristics may include a list of components of each system, operating specifications applicable to the system and its constituent components, a list of vehicles with which the system is compatible, and other characteristics.

As determined by the vehicle configuration evaluation module 111, traversing the trail with a current user vehicle system and/or component may call for the current user vehicle system and/or component to operate outside its specifications. In such a case, the vehicle configuration modification module 113 may include instructions that when executed by the one or more processors cause the one or more processors to search the library for compatible corresponding user vehicle system(s) and/or component(s) which have operating specifications encompassing or including the ride information parameter values produced by traversal of the trail by the reference vehicle. If such alternative corresponding user vehicle system(s) and/or component(s) is installed in the user vehicle in place of the current user vehicle system(s) and/or component(s), the alternative corresponding user vehicle system(s) and/or component(s) may enable the user vehicle to traverse the trail.

In one or more arrangements, related alternative corresponding user vehicle system and/or component source information such as vehicle dealer information, price information, and other information may also be stored in the library. The dealer information may include information (i.e., contact information, location, etc.) relating to vehicle dealers and/or vehicle repair facilities qualified to install the alternative corresponding user vehicle system in the user vehicle. Price information may include prices of the alternative corresponding user vehicle system from various sources, as well as order lead times and other information.

In one or more arrangements, the vehicle configuration modification module 113 may include instructions that when executed by the one or more processor(s) 110 cause the one or more processors to prompt a user so as to enable ordering of an alternative corresponding user vehicle system by the user and specification by the user of an installation facility for installing the alternative corresponding user vehicle system in the user vehicle. The vehicle configuration modification module 113 may also include instructions that when executed by the one or more processor(s) 110 cause the one or more processors to automatically direct delivery of the alternative corresponding user vehicle system to the installation facility. The information in the library regarding compatible user vehicle systems, vehicle dealer information, price information, etc., may be constantly updated so that the latest available information may be accessed when needed.

For purposes of identifying alternative systems and components which are compatible with the user vehicle, an alternative vehicle system/component directory 189 may be provided. The alternative vehicle system/component directory 189 may store information correlating various vehicle models with systems and components compatible with each model. The alternative vehicle system/component directory 189 may be stored in a cloud facility. Alternatively, a condensed version of the directory 189 pertaining only to the user vehicle model may be stored in a memory on the user vehicle. This directory may be updated periodically by downloads from a cloud facility or other suitable source.

The vehicle configuration modification module 113 may include instructions that when executed by the one or more processor(s) 110 cause the one or more processors to determine, using information from the alternative vehicle system/component directory 189, which systems and/or components may be substituted for corresponding systems and/or components in the user vehicle. The vehicle configuration evaluation module 111 may include instructions that when executed by the one or more processor(s) 110 cause the one or more processors to compare any compatible alternative system or component with ride information relating to the proposed trail, in the manner previously described. This activity may determine if substitution of a given possible alternative system or component would render the user vehicle suitable for traversing the proposed trail. This process may be conducted, in conjunction with the vehicle configuration modification module 113, for all possible alternative systems and/or components until the suitability or unsuitability of each possible alternative system and/or component has been determined. The vehicle configuration modification module 113 may be configured to, if no suitable alternative system or component is revealed, generate a message to this effect.

The vehicle configuration modification module 113 may also be configured to, if the current configuration of the user vehicle does not enable the user vehicle to traverse the trail in spite of the presence of a special condition, check for supplemental equipment that may facilitate user vehicle trail traversal without damage. To this end, the vehicle configuration modification module may be configured to correlate each of a variety of special conditions with any supplemental equipment which may be added to the user vehicle to aid the user vehicle in traversing the proposed trail without damage when the special conditions are encountered. Look-up tables and/or other data structures may be used to correlate special conditions with applicable supplemental equipment.

If the vehicle configuration modification module 113 determines that compatible supplemental equipment exists that may facilitate user vehicle trail traversal without damage, a message may be generated containing information regarding the supplemental equipment. This information may enable a user to suitably modify the user vehicle for traversing the trail.

For example, in one possible scenario, reference vehicle sensor information may indicate that, during driving the trail, the reference vehicle was partially immersed in water up to a certain depth due to the reference vehicle transiting a deep stream or other body of water. User vehicle specifications may indicate that the user vehicle may ford a body of water up to a predetermined depth without the use of special equipment, such as a snorkel.

The vehicle configuration evaluation module 111 may, in a case where immersion of the reference vehicle is determined from sensor data or other ride information, compare the depth of the water encountered by the reference vehicle with a maximum allowable fording depth of the user vehicle. If the depth of the water on the trail exceeds the maximum allowable fording depth of the user vehicle, the vehicle configuration evaluation module 111 may determine that the user vehicle may not be able to traverse the stream without possible damage to the user vehicle. As a result, the vehicle configuration evaluation module 111 may determine that that the user vehicle configuration information is not consistent with the ride information. Information regarding the pertinent special condition may be passed to the vehicle configuration modification module 111, which may determine if there is any supplemental equipment which may be installed on the user vehicle to enable traversal of the trail without damage to the user vehicle.

In one or more arrangements, the autonomous driving module 160 may include instructions that when executed by the one or more processor(s) 110 cause the one or more processors to, responsive to a determination that the configuration information is consistent with the associated ride information, autonomously operate the vehicle so as to traverse the offroad trail. The autonomous driving module 160 may prompt a user to enable selection of an autonomous driving mode for traversing the trail.

The autonomous driving module 160 may include instructions that when executed by the one or more processor(s) 110 cause the one or more processors to access and process the ride information acquired from the reference vehicle's traversal of the trail to autonomously control the user vehicle in traversing the trail. This enables the user vehicle autonomous driving module(s) 160 to take advantage of the data acquired by the reference vehicle during previous traversal of the trail. For example, the ride information may include navigational coordinates of the trail route and of trail features such as obstacles, bump, depressions, etc. The autonomous driving module(s) 160 may autonomously control operation of vehicle systems and components to safely and efficiently traverse such terrain features. In addition, the user vehicle autonomous driving module(s) 160 may control operation of the user vehicle 100 to match the speed profile of the reference vehicle during the previous traversal of the trail, which is known to have resulted in a safe traversal of the trail. Generally, the user vehicle autonomous driving module(s) 160 may use the data and other information contained in the ride information to control operation of the user vehicle to safely and efficiently traverse the trail.

Figure 2:
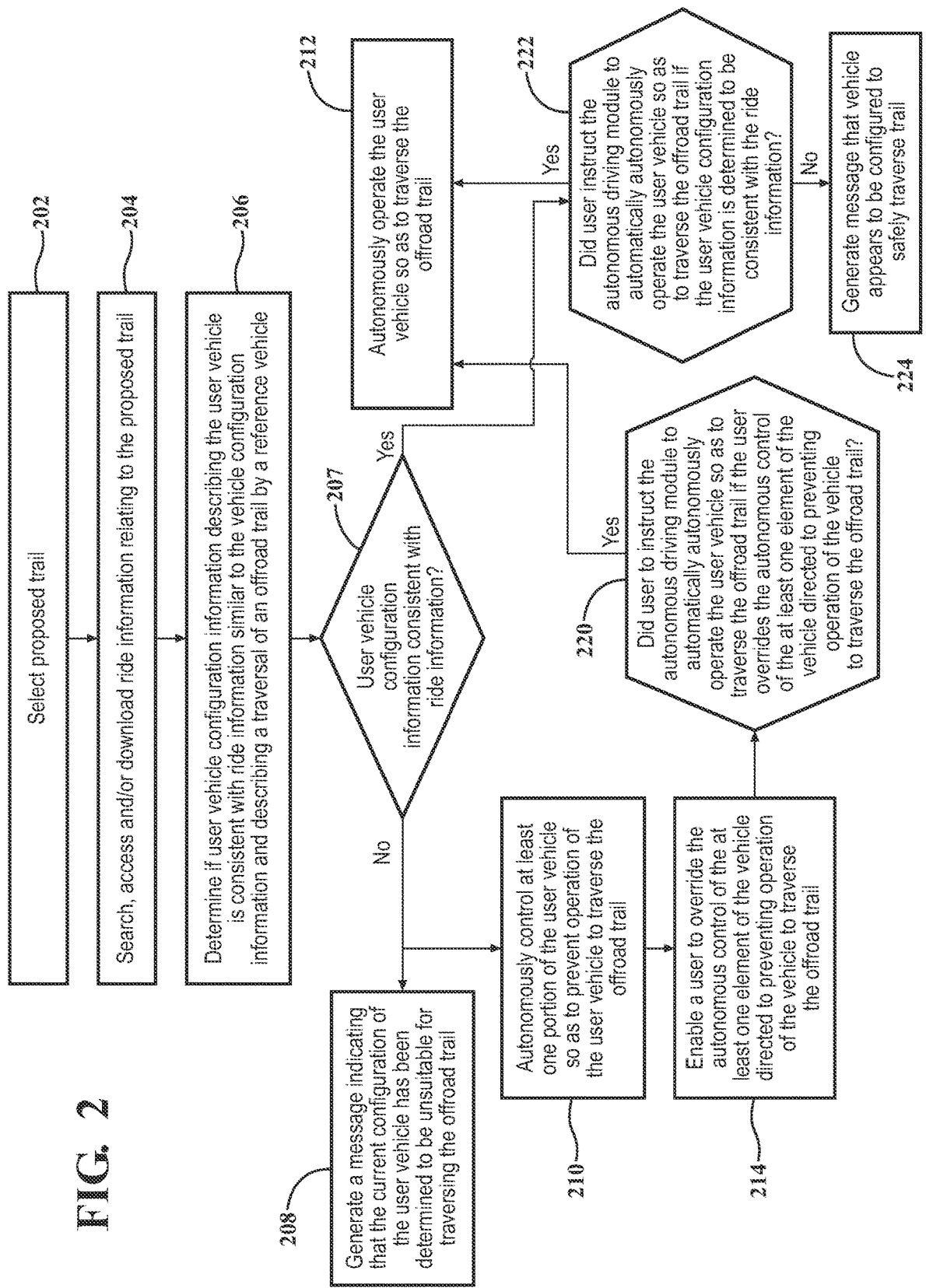
FIG. 2 is a flow diagram illustrating operations consequent to a determination as to whether user vehicle configuration information is consistent with ride information relating to a proposed offroad trail, in accordance with an embodiment described herein.

Operation of an embodiment of the offroad travel assistance system will now be discussed with reference to FIGS. 1-4. Referring to FIG. 2, in block 202, a user may select a proposed trail for evaluation by the user vehicle configuration evaluation module 111. Ride information acquired for trails which have been previously successfully traversed by one or more reference vehicles may be stored on a cloud storage facility (such as facility 219) or another storage facility for remote access by the user vehicle 100. The user vehicle input system 130 may be configured to enable access of ride information to enable the user to learn more about trails for which ride information has been compiled.

Referring to block 204, elements of the offroad travel assistance system 109 (such as vehicle configuration evaluation module 111) may be configured to, after user selection of a proposed trail, search, access and/or download ride information relating to the proposed trail for purposes of comparing the user vehicle configuration information with the ride information pertaining to the trail.

Figure 3B:
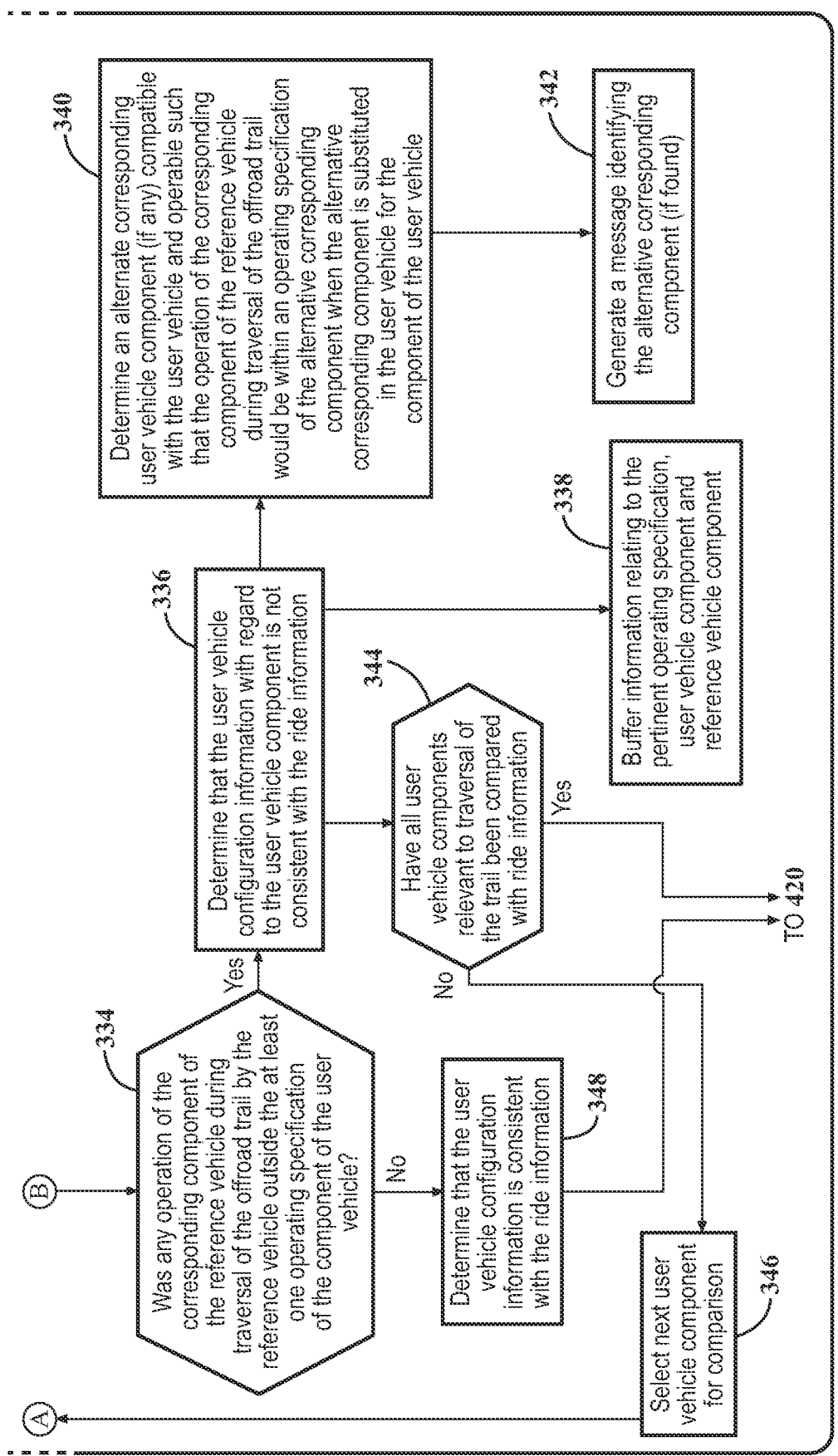
FIG. 3B is a flow diagram illustrating further operations conducted to determine whether user vehicle configuration information is consistent with ride information relating to the proposed offroad trail.

After acquiring available road information relating to the proposed trail, the vehicle configuration evaluation module 111 may (in block 206) determine if user vehicle configuration information describing the user vehicle 100 is consistent with ride information similar to the user vehicle configuration information and describing a traversal of an offroad trail by a reference vehicle. FIGS. 3A and 3B illustrate an embodiment of a process usable in block 206 for determining if user vehicle configuration information describing the user vehicle 100 is consistent with ride information similar to the vehicle configuration information.

In block 302, the vehicle configuration evaluation module 111 may select a user vehicle system which is pertinent to the ability of the user vehicle to traverse the trail. As stated previously, user vehicle systems and/or components (and related information) pertinent to the user vehicle's ability to traverse an offroad trail may be identified prior to configuration of the offroad travel assistance system.

In block 304, the vehicle configuration evaluation module may compare user vehicle configuration information including at least one operating specification of the selected system of the user vehicle with ride information relating to operation of a corresponding system of the reference vehicle during traversal of the offroad trail by the reference vehicle, as previously described.

In block 306, if any operation of the corresponding system of the reference vehicle during traversal of the offroad trail by the reference vehicle was outside the at least one operating specification of the system of the selected user vehicle system, the vehicle configuration evaluation module may determine (in block 310) that the user vehicle configuration information with regard to the selected user vehicle system is not consistent with the ride information.

Following a determination in block 310 that the user vehicle configuration information with regard to the selected user vehicle system is not consistent with the ride information, the vehicle configuration evaluation module 111 may (in block 312) buffer information relating to the pertinent operating specification, user vehicle system, corresponding reference vehicle system, and any other pertinent information. Following a determination in block 310 that the user vehicle configuration information with regard to the selected user vehicle system is not consistent with the ride information, the vehicle configuration evaluation module 111 may also (in block 318) determine an alternative corresponding vehicle system compatible with the user vehicle and which is operable such that the operation of the corresponding system of the reference vehicle during traversal of the offroad trail would be within an operating specification of the alternative corresponding system when the alternative corresponding system is substituted in the user vehicle for the current system of the user vehicle, as previously described. The vehicle configuration evaluation module 111 may then (in block 320) generate a message identifying the alternative corresponding system which may be substituted for the current vehicle system. Blocks 312, 318, and 320 may be repeated for each user vehicle system for which a determination is made that the user vehicle configuration information with regard to the user vehicle system is not consistent with the ride information.

Returning to block 310, following a determination that the user vehicle configuration information with regard to the user vehicle system is not consistent with the ride information, the vehicle configuration evaluation module 111 may determine (in block 314) if all user vehicle systems relevant to traversal of the trail have been compared with ride information. If all user vehicle systems relevant to traversal of the trail have not been compared with ride information, control may transfer to block 316, where the vehicle configuration evaluation module 111 may select or determine the next user vehicle system to be compared to ride information. Control may then transfer to block 304, where the process just described repeats until all pertinent vehicle systems have been compared with ride information.

Returning again to block 306, if no operations of the corresponding system of the reference vehicle during traversal of the offroad trail by the reference vehicle are outside the at least one operating specification of the system of the user vehicle, then the user vehicle system currently being examined may be considered suitable for traversing the proposed trail. Control may then transfer to block 314 as previously described, where the vehicle configuration evaluation module 111 may determine if all user vehicle systems relevant to traversal of the trail have been compared with ride information.

If it is determined in block 314 that all user vehicle systems relevant to traversal of the trail have been compared with ride information, the vehicle configuration evaluation module 111 may compare user vehicle configuration information including at least one operating specification of a component of the user vehicle with ride information relating to operation of a corresponding component of the reference vehicle during traversal of the offroad trail by the reference vehicle, as previously described. This procedure may be performed for all user vehicle components deemed pertinent to whether the user vehicle can traverse the proposed trail. To this end, the vehicle configuration evaluation module 111 may (in block 330) select a pertinent user vehicle component for comparison with reference vehicle ride information.

The vehicle configuration evaluation module 111 may then (in block 332) compare user vehicle configuration information including at least one operating specification of the selected component of the user vehicle with ride information relating to operation of a corresponding component of the reference vehicle during traversal of the offroad trail by the reference vehicle.

This comparison may be used to determine (in block 334) if any operation of the corresponding component of the reference vehicle during traversal of the offroad trail by the reference vehicle was outside the at least one operating specification of the component of the user vehicle.

Referring to block 348, if no operation of the corresponding component of the reference vehicle during traversal of the offroad trail by the reference vehicle was outside the at least one operating specification of the component of the user vehicle, the vehicle configuration evaluation module 111 may determine that the user vehicle configuration information is consistent with the ride information. Control may then pass back to block 420 (FIG. 4) (described elsewhere herein).

However, if it is determined in block 334 that an operation of the corresponding component of the reference vehicle during traversal of the offroad trail by the reference vehicle was outside the at least one operating specification of the component of the user vehicle, the vehicle configuration evaluation module 111 may determine (in block 336) that that the user vehicle configuration information with regard to the user vehicle component is not consistent with the ride information. The vehicle configuration evaluation module 111 may then (in block 338) buffer information relating to the pertinent operating specification, user vehicle component, and reference vehicle component for later reference by the user.

The vehicle configuration modification module 113 may then (in block 340 and, optionally, in conjunction with the vehicle configuration evaluation module 111) determine an alternative corresponding user vehicle component compatible with the user vehicle 100 and operable such that the operation of the corresponding component of the reference vehicle during traversal of the offroad trail would be within an operating specification of the alternative corresponding component when the alternative corresponding component is substituted in the user vehicle 100 for the component of the user vehicle. For example, in a case where the maximum reference vehicle transmission temperature was found to exceed the maximum allowable user vehicle transmission temperature, the vehicle configuration modification module 113 may find an alternative transmission cooler that is compatible with the user vehicle 100 and which should maintain the transmission at a temperature below the maximum operating specification temperature of the user vehicle 100 for the transmission usage parameters recorded in the ride information.

The vehicle configuration evaluation module 111 or the vehicle configuration modification module 113 may then (in block 342) generate a message identifying the alternative corresponding component.

Following the determination in block 336 that the user vehicle configuration information with regard to the user vehicle component is not consistent with the ride information, the vehicle configuration evaluation module 111 may also buffer information relating to the pertinent operating specification, the user vehicle component and the reference vehicle component.

Following the determination in block 336, the vehicle configuration evaluation module 111 may also (in block 344) determine if all user vehicle components relevant to traversal of the trail have been compared with ride information.

If it is determined in block 344 that all user vehicle components relevant to traversal of the trail have not been compared with ride information, the vehicle configuration evaluation module 111 may (in block 346) select a next user vehicle component for comparison with ride information. Control may then pass back to block 332, where the process just described is repeated for the next selected component. This process may be continued until all use vehicle components relevant to traversal of the trail have been compared with ride information.

If no alternative corresponding components or systems are identified in the process described above, the vehicle configuration evaluation module 111 or the vehicle configuration modification module 113 may generate a message indicating that no alternative corresponding components or systems were found. This may indicate to a user that the user vehicle may not be capable of modification so as to make traversal of the proposed offroad trail feasible without possible damage to the user vehicle.

Figure 4:
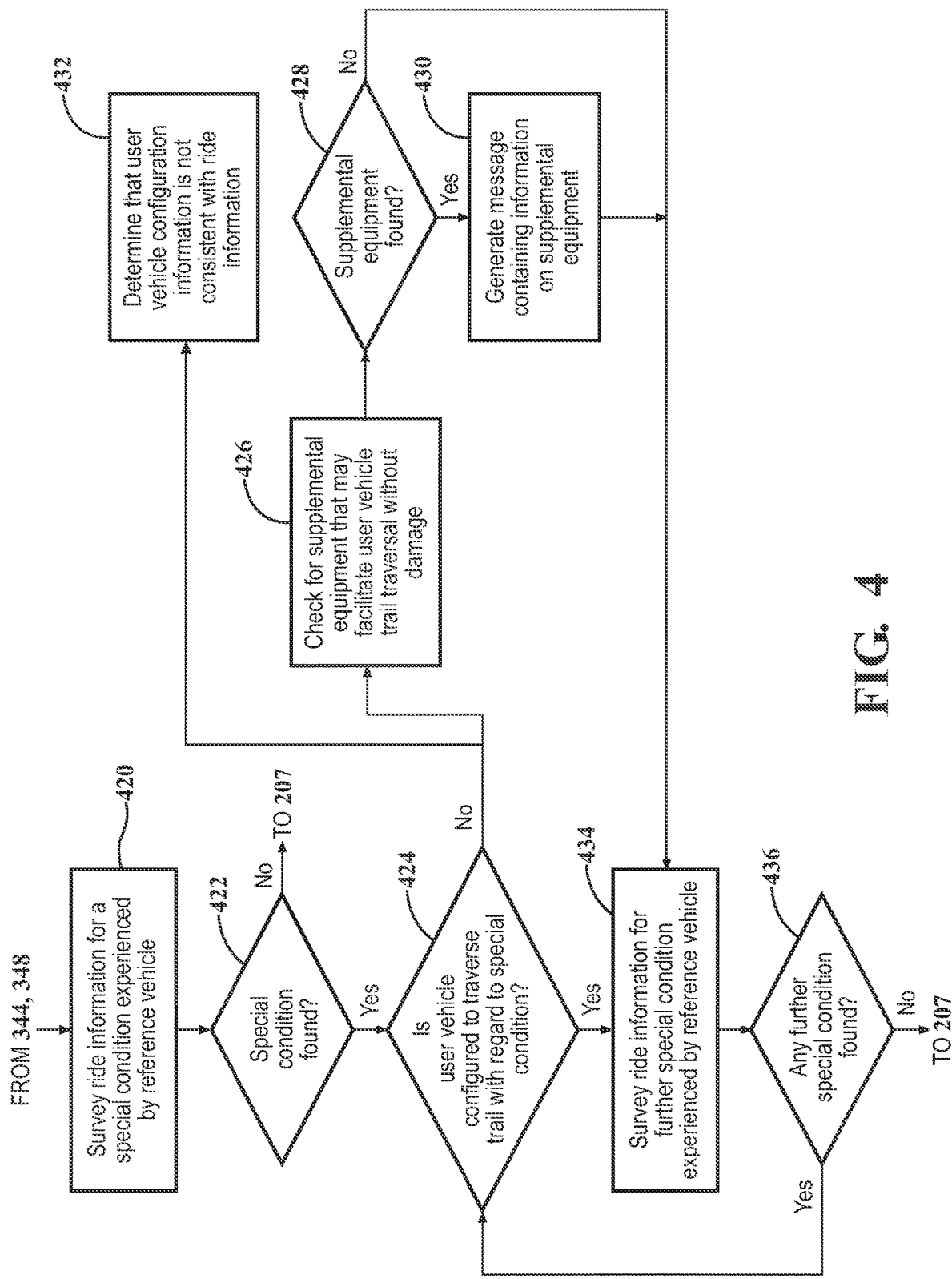
FIG. 4 is a flow diagram illustrating operations conducted to determine if a reference vehicle experienced one or more special conditions during traversal of a proposed offroad trail.

Referring to FIGS. 3B and 4, if it is determined in block 344 that all user vehicle components relevant to traversal of the trail have been compared with ride information, control may pass to block 420, where the vehicle configuration evaluation module 111 may survey the ride information to determine (in block 422) if a special condition was experienced by the reference vehicle.

If it is determined that no special condition was experienced by the reference vehicle, control may proceed to block 207 (FIG. 2). However, if it is determined that a special condition was experienced by the reference vehicle during traversal of the trail, the vehicle configuration evaluation module 111 may (in block 424) determine if the user vehicle is configured to traverse the proposed trail with regard to (i.e., in spite of) the special condition on the trail.

If the user vehicle is not configured to traverse the proposed trail with regard to (i.e., in spite of) the special condition on the trail, the vehicle configuration evaluation module 111 may determine (in block 432) that the user vehicle configuration information is not consistent with ride information. Simultaneously, the vehicle configuration modification module 111 may (in block 426) check for supplemental equipment that may facilitate user vehicle trail traversal without damage.

If no supplemental equipment that may facilitate user vehicle trail traversal without damage is found, control may proceed to block 434, where ride information may be surveyed for any further special condition experienced by the reference vehicle. In block 436, if no further special condition experienced by the reference vehicle is found, control may pass to block 207 (FIG. 2). However, if a further special condition experienced by the reference vehicle is found, control may pass to block 424, previously described.

Returning to block 424, if the user vehicle is configured to traverse the proposed trail in spite of the special condition on the trail, control may pass to block 434, where ride information may be surveyed for any further special condition experienced by the reference vehicle.

Returning to block 428, if supplemental equipment that may facilitate user vehicle trail traversal without damage is found, a message may be generated in block 430 generate message containing information on the supplemental equipment. Control may then pass to block 434.

Referring again to FIG. 2, if based on the steps performed in FIGS. 3A and 3B, it is determined that the user vehicle configuration information is consistent with ride information, the vehicle configuration evaluation module 111 may (in block 222) determine if a user previously instructed the autonomous driving module(s) 160 to automatically autonomously operate the user vehicle 100 so as to traverse the offroad trail if the user vehicle configuration information is determined to be consistent with the ride information.

If a user did not previously instruct the autonomous driving module(s) 160 to automatically autonomously operate the user vehicle 100 so as to traverse the offroad trail if the user vehicle configuration information is determined to be consistent with the ride information, the vehicle configuration evaluation module 111 may (in block 224) generate a message that the vehicle appears to be configured to safely traverse the offroad trail. However, if a user previously instructed the autonomous driving module(s) 160 to automatically autonomously operate the user vehicle 100 so as to traverse the offroad trail if the user vehicle configuration information is determined to be consistent with the ride information, the autonomous driving module(s) 160 may (in block 212) autonomously operate the user vehicle so as to traverse the offroad trail. If a user did not previously instructed the autonomous driving module(s) 160 to automatically autonomously operate the user vehicle in such a manner, the vehicle may be operated manually, semi-autonomously, or autonomously to drive the trail according to user preferences.

Returning to block 207, if it is determined that the user vehicle configuration information 116 is not consistent with ride information, the vehicle configuration evaluation module 111 may generate a message (in block 208) indicating that a current configuration of the user vehicle has been determined to be unsuitable for traversing the offroad trail. The vehicle configuration evaluation module 111 may also (in block 210) interface with portion(s) of the user vehicle 100 (including, autonomous driving module(s) 160) to autonomously control at least one portion of the user vehicle so as to prevent operation of the user vehicle to traverse the offroad trail.

In one or more arrangements, autonomous control of portion(s) of the user vehicle so as to prevent operation of the user vehicle to traverse the offroad trail may be activated but dormant (i.e., the autonomous control may only be exercised in cases where, for example, the user vehicle is within a predetermined distance from a start of the trail (or another portion of the trail) and appears to be moving toward the trail). The autonomous control of the portion(s) of the user vehicle may remain in effect until actively overridden by a user. Thus, autonomous control of portion(s) of the user vehicle may go into effect at any point in time when the user is within the predetermined distance of the trail.

After the autonomous control of the portion(s) of the user vehicle is activated, the vehicle configuration evaluation module 111 may (in block 214), enable a user to override the autonomous control of the at least one element of the vehicle directed to preventing operation of the vehicle to begin to drive the offroad trail. A prompt to the user enabling overriding of the autonomous control may be communicated to the user via output system 135 or any other suitable method. The user override may be input using the input system 130 or using any other suitable method. The selection of the override option by the user may enable the user to traverse the trail manually, semi-autonomously, or autonomously per user preference.

Following user selection of the override option, the vehicle configuration evaluation module 111 and/or the autonomous driving module(s) 160 may (in block 220) determine if a user previously instructed the autonomous driving module(s) 160 to automatically autonomously operate the user vehicle so as to traverse the offroad trail if the user overrides the autonomous control of the at least one element of the vehicle directed to preventing operation of the vehicle to drive the offroad trail. The user may have selected this option prior to evaluation of the offroad trail, for example, so that autonomous driving of the trail could be implemented as soon as an override command is given.

If a user previously instructed the autonomous driving module(s) 160 to automatically autonomously operate the user vehicle so as to traverse the offroad trail in case of override, control may pass to block 212 where the vehicle may be autonomously operated as previously described.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-3B, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module, as envisioned by the present disclosure, is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. An offroad travel assistance system for a user vehicle, the system comprising:
   one or more processors; and
   a memory communicably coupled to the one or more processors and storing a user vehicle configuration evaluation module including computer-readable instructions that when executed by the one or more processors cause the one or more processors to:
   determine if user vehicle configuration information describing the user vehicle is consistent with ride information similar to the user vehicle configuration information and describing a traversal of an offroad trail by a reference vehicle;
   responsive to a determination that the user vehicle configuration information is not consistent with the ride information, control at least one portion of the user vehicle so as to autonomously prevent manual operation of the user vehicle to traverse the offroad trail;
   responsive to a determination that the user vehicle configuration information is consistent with the ride information:
   determine if the reference vehicle encountered, during traversal of the offroad trail, a special condition which may require that supplemental vehicle system(s) and/or component(s) be installed in the user vehicle to enable the user vehicle to traverse the offroad trail;
   responsive to a determination that the reference vehicle encountered a special condition during traversal of the offroad trail, determine if the user vehicle is currently configured to traverse the offroad trail with regard to the special condition; and
   responsive to a determination that the user vehicle is not currently configured to traverse the offroad trail with regard to the special condition, check for user vehicle-compatible supplemental equipment that may be added to the user vehicle to facilitate trail traversal without damage.

2. The offroad travel assistance system of claim 1 wherein the memory further stores an autonomous driving module including computer-readable instructions that when executed by the one or more processors cause the one or more processors to autonomously operate the user vehicle so as to traverse the offroad trail.

3. The offroad travel assistance system of claim 2 wherein the autonomous driving module includes computer-readable instructions that when executed by the one or more processors cause the one or more processors to autonomously control operation of the user vehicle so as to traverse the offroad trail responsive to a user overriding autonomous control of the at least one portion of the user vehicle directed to preventing operation of the user vehicle to begin to drive the offroad trail.

4. The offroad travel assistance system of claim 3 wherein the autonomous driving module further includes computer-readable instructions that when executed by the one or more processors cause the one or more processors to enable a user to instruct the autonomous driving module to automatically autonomously operate the user vehicle so as to traverse the offroad trail when the user overrides autonomous control of the at least one portion of the user vehicle directed to preventing operation of the user vehicle to begin to drive the offroad trail.

5. The offroad travel assistance system of claim 2 wherein the autonomous driving module includes computer-readable instructions that when executed by the one or more processors cause the one or more processors to autonomously operate the user vehicle so as to traverse the offroad trail responsive to a determination that the user vehicle configuration information is consistent with the ride information similar to the user vehicle configuration information.

6. The offroad travel assistance system of claim 5 wherein the autonomous driving module further includes computer-readable instructions that when executed by the one or more processors cause the one or more processors to enable a user to instruct the autonomous driving module to automatically autonomously operate the user vehicle so as to traverse the offroad trail responsive to a determination that the user vehicle configuration information is consistent with the ride information.

7. The offroad travel assistance system of claim 1, wherein the user vehicle configuration evaluation module further includes instructions that when executed by the one or more processors cause the one or more processors to, responsive to autonomous control of at least one portion of the user vehicle so as to prevent operation of the user vehicle to traverse the offroad trail, enable a user to override autonomous control of the at least one portion of the user vehicle directed to preventing operation of the user vehicle to begin to drive the offroad trail.

8. The offroad travel assistance system of claim 1 wherein the user vehicle configuration evaluation module includes instructions that when executed by the one or more processors cause the one or more processors to:
   compare user vehicle configuration information including at least one operating specification of a system of the user vehicle with ride information relating to operation of a corresponding system of the reference vehicle during traversal of the offroad trail by the reference vehicle; and responsive to any operation of the corresponding system of the reference vehicle during traversal of the offroad trail by the reference vehicle being outside the at least one operating specification of the system of the user vehicle, determine that the user vehicle configuration information is not consistent with the ride information.

9. The offroad travel assistance system of claim 8 wherein the system of the user vehicle is an active suspension system of the user vehicle and the system of the reference vehicle is an active suspension system of the reference vehicle.

10. The offroad travel assistance system of claim 8 wherein the memory further stores a user vehicle configuration modification module including instructions that when executed by the one or more processors cause the one or more processors to:

responsive to a determination that an operation of the corresponding system of the reference vehicle during traversal of the offroad trail was outside the at least one operating specification of the system of the user vehicle, determine at least one alternative corresponding user vehicle system compatible with the user vehicle and which is operable such that the operation of the corresponding system of the reference vehicle during traversal of the offroad trail would be within an operating specification of the alternative corresponding user vehicle system when the alternative corresponding user vehicle system is substituted in the user vehicle for the system of the user vehicle.

11. The offroad travel assistance system of claim 1 wherein the user vehicle configuration evaluation module includes instructions that when executed by the one or more processors cause the one or more processors to:

compare user vehicle configuration information including at least one operating specification of a component of the user vehicle with ride information relating to operations of a corresponding component of the reference vehicle during traversal of the offroad trail by the reference vehicle; and responsive to any operation of the corresponding component of the reference vehicle during traversal of the offroad trail by the reference vehicle being outside the at least one operating specification of the component of the user vehicle, determine that the user vehicle configuration information is not consistent with the ride information.

12. The offroad travel assistance system of claim 11 wherein the memory further stores a user vehicle configuration modification module including instructions that when executed by the one or more processors cause the one or more processors to:

responsive to a determination that an operation of the corresponding component of the reference vehicle during traversal of the offroad trail was outside the at least one operating specification of the component of the user vehicle, determine at least one alternative corresponding user vehicle component compatible with the user vehicle and which is operable such that the operation of the corresponding component of the reference vehicle during traversal of the offroad trail would be within an operating specification of the alternative corresponding user vehicle component when the alternative corresponding user vehicle component is substituted in the user vehicle for the component of the user vehicle.

13. The offroad travel assistance system of claim 1, wherein the user vehicle configuration evaluation module further includes instructions that when executed by the one or more processors cause the one or more processors to, responsive to a determination that the user vehicle configuration information is not consistent with the ride information, generate a message indicating that a current configuration of the user vehicle has been determined to be unsuitable for traversing the offroad trail.

14. A vehicle comprising an offroad travel assistance system the system comprising:

one or more processors; and a memory communicably coupled to the one or more processors and storing a user vehicle configuration evaluation module including computer-readable instructions that when executed by the one or more processors cause the one or more processors to:

determine if user vehicle configuration information describing the user vehicle is consistent with ride information similar to the user vehicle configuration information and describing a traversal of an offroad trail by a reference vehicle;

responsive to a determination that the user vehicle configuration information is not consistent with the ride information, control at least one portion of the user vehicle so as to autonomously prevent manual operation of the user vehicle to traverse the offroad trail;

responsive to a determination that the user vehicle configuration information is consistent with the ride information:

determine if the reference vehicle encountered, during traversal of the offroad trail, a special condition which may require that supplemental vehicle system(s) and/or component(s) be installed in the user vehicle to enable the user vehicle to traverse the offroad trail;

responsive to a determination that the reference vehicle encountered a special condition during traversal of the offroad trail, determine if the user vehicle is currently configured to traverse the offroad trail with regard to the special condition; and responsive to a determination that the user vehicle is not currently configured to traverse the offroad trail with regard to the special condition, check for user vehicle-compatible supplemental equipment that may be added to the user vehicle to facilitate trail traversal without damage.

15. A method of controlling operation of a user vehicle, the method comprising steps of:

determining if user vehicle configuration information describing the user vehicle is consistent with ride information similar to the user vehicle configuration information and describing a traversal of an offroad trail by a reference vehicle;

responsive to a determination that the user vehicle configuration information is not consistent with the ride information, autonomously controlling at least one portion of the user vehicle so as to prevent operation of the user vehicle to traverse the offroad trail;

responsive to a determination that the user vehicle configuration information is consistent with the ride information, determining if the reference vehicle encountered, during traversal of the offroad trail, a special condition which may require that supplemental vehicle system(s) and/or component(s) be installed in the vehicle to enable the vehicle to traverse the offroad trail;

responsive to a determination that the reference vehicle encountered a special condition during traversal of the offroad trail, determining if the user vehicle is currently configured to traverse the offroad trail with regard to the special condition; and responsive to a determination that the user vehicle is not currently configured to traverse the offroad trail with regard to the special condition, checking for user vehicle-compatible supplemental equipment that may be added to the user vehicle to facilitate trail traversal without damage.

16. The method of claim 15 further comprising the step of autonomously controlling operation of the user vehicle so as to traverse the offroad trail responsive to a user overriding autonomous control of the at least one portion of the user vehicle directed to preventing operation of the user vehicle to begin to drive the offroad trail.

17. The method of claim 15 further comprising the step of autonomously operating the user vehicle so as to traverse the offroad trail responsive to a determination that the user vehicle configuration information is consistent with the ride information similar to the user vehicle configuration information.

* * * * *